No. 698,664. Patented Apr. 29, 1902.
T. DUNCAN.
MOTOR METER.
(Application filed Oct. 11, 1899. Renewed Jan. 6, 1902.)
(No Model.) 2 Sheets—Sheet 1.
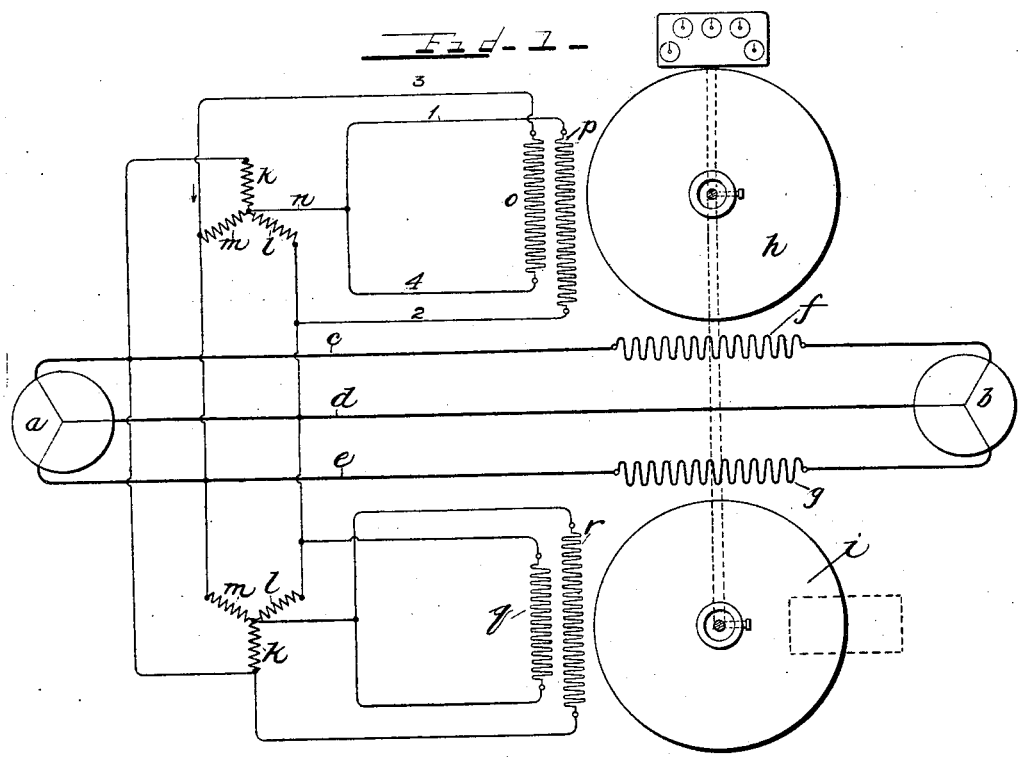
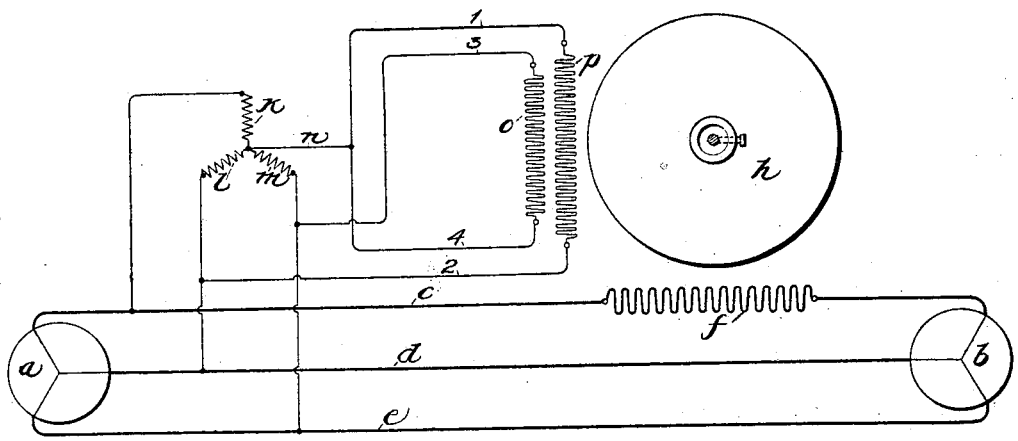
Witnesses
C. J. Schmidt
May Zabel
Inventor
Thomas Duncan
By Charles A. Brown & Cragg
Attorneys No. 698,664. Patented Apr. 29, 1902.
T. DUNCAN.
MOTOR METER.
(Application filed Oct. 11, 1899. Renewed Jan. 6, 1902.)
(No Model.) 2 Sheets—Sheet 2.
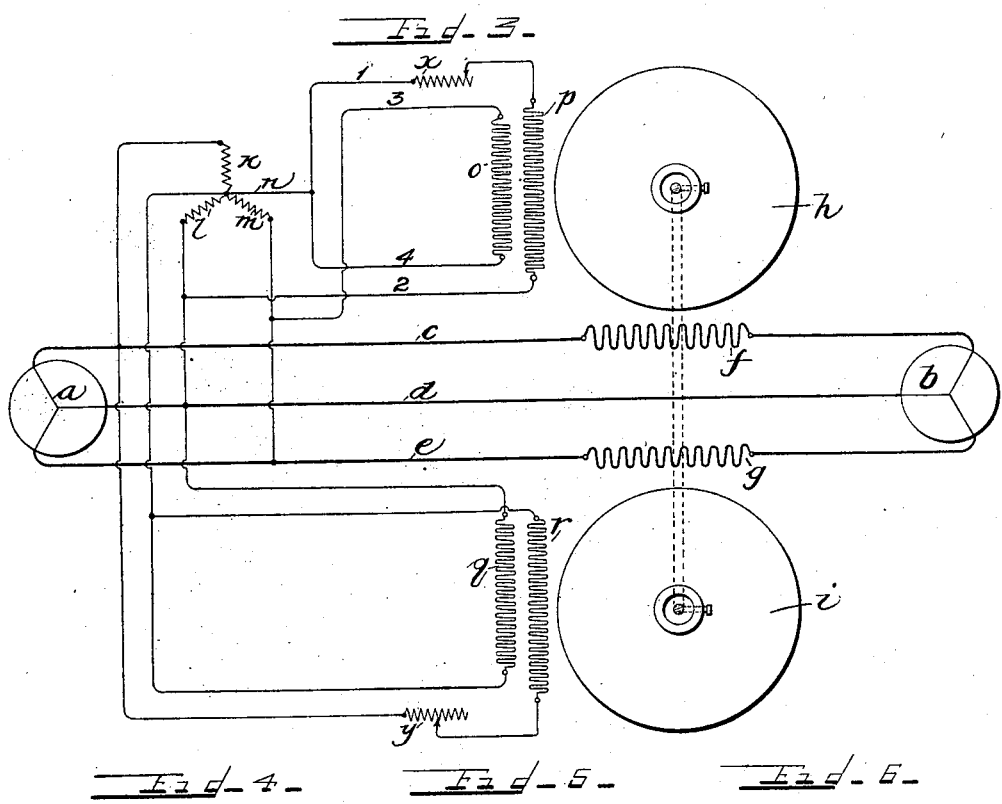
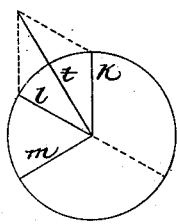
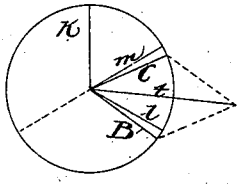
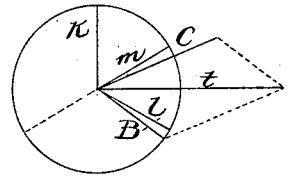
Witnesses
C. J. Schmidt
May Zabel
Inventor
Thomas Duncan
By Charles A. Brown & Bragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

MOTOR-METER.

SPECIFICATION forming part of Letters Patent No. 698,664, dated April 29, 1902.

Application filed October 11, 1899. Renewed January 6, 1902. Serial No. 88,485. (No model.)

*To all whom it may concern:*

Be it known that I, THOMAS DUNCAN, a citizen of the United States, residing at Chicago, in the county of Cook and State of Illinois, have invented a certain new and useful Improvement in Motor-Meters, (Case No. 286,) of which the following is a full, clear, concise, and exact description, reference being had to the accompanying drawings, forming a part of this specification.

My invention relates to improvements in motor-meters, and particularly to the class of meters adapted to measure the currents in three-phase systems of alternating-current distribution.

The object of the invention is so to organize and arrange the three pressure-circuits representing the electromotive forces of the three-phase system of distribution that magnetic fields can be obtained in the meter to represent the impressed electromotive force of the work-circuits or those circuits whose current traverses the series field-windings and to maintain these magnetic fields in quadrature with the impressed electromotive force of the pressure-circuits in a manner similar to the practice employed in single or two phase induction motor-meters.

It is well known that in order to measure accurately inductive loads the magnetism representing the pressure must be displaced ninety degrees from the pressure—that is, it must either lag or lead the phase of the pressure by ninety degrees. I am aware that an arrangement has been used for measuring three-phase currents in employing two motors attached to a single spindle and registering device; but the practice is to treat each in the same manner as a single-phase meter—that is, by supplementing the shunt or pressure field-windings of the meter with an auxiliary coil which is the seat of induced currents and is short-circuited upon itself through a suitable and generally an adjustable resistance. In the present arrangement I employ only the three circuits or pressures without any auxiliary secondaries or other subsidiary phase-changing devices.

My invention will be more readily understood by reference to the accompanying drawings, in which—

Figure 1 is a diagrammatic view of a double-motor arrangement embodying my invention and one in which the arrangement shown would accurately measure all power factors, whether the several power-circuits are balanced or not. Fig. 2 is a diagrammatic view showing the use of a single-motor arrangement which is applicable only to cases where the three circuits are perfectly balanced, which is a condition that rarely exists in practice. Fig. 3 is also a diagrammatic view wherein is shown the use of only one star pressure-winding or artificial neutral resistance supplying both motors. Figs. 4, 5, 6, 7, 8, and 9 are vector diagrams showing the relative phase angles of the pressure and magnetism in the three shunt-circuits of the meter.

Similar characters of reference designate similar parts in the different views.

The series field-coils $f$ $g$ of Fig. 1 are connected in circuit, as shown—that is, each series coil is connected in one of the main leads of the system which comprises the three-phase generator $a$ and the motor $b$, connected by the three leads $c$ $d$ $e$. The series field-windings may be connected to any two of the three leads. I have shown them in Figs. 1 and 3 as connected to the upper and lower. In inductive relation to the series field-windings are two aluminium inverted-cup-shaped armatures mechanically connected and preferably mounted upon the same spindle, and each armature is also in inductive relation to two pressure field-windings, as hereinafter explained.

The apparatus illustrated in Fig. 2 has the same mode of operation substantially as that of Fig. 1, and as it is less complicated, owing to its having only one motor device, I will explain my invention in detail by reference to this figure.

The three-phase generator is shown as supplying current to an inductive load $b$; but it will be understood, of course, that lamps or other translating devices may be connected in circuit if desired, since the meter will measure the true energy of the circuit in watts irrespective of the load conditions.

In one of the leads $c$ I include the series field-coil $f$, through which passes the current over the wire $c$. In inductive relation to this field-coil and suitably mounted to revolve is the aluminium armature $h$. To cause a magnetic field that will represent the pressure in volts, I employ a shunt-winding $p$, that is supplied from an artificial neutral resistance $k\ l\ m$. The function of this artificial neutral resistance is to reproduce the pressure conditions of the three coils of the dynamo, which is necessary only in the case of star-wound generators and systems of distribution, as is shown in Figs. 1, 2, and 3 herein, because with mesh systems of winding the pressure of the circuits is the pressure of the generator-windings, as is understood by those skilled in the art. The series field-winding $f$ being connected directly in the circuit $c$, the current therethrough will be in phase with the pressure of the corresponding generator-coil, assuming that the load is a non-inductive one. This current and pressure may be assumed to be represented by the line $k$, Fig. 4, while the remaining lines $l$ and $m$ represent the other two currents and pressures of the system.

It is necessary for the operation of the meter to get a voltage magnetic field that is displaced ninety degrees from $k$. In order to secure this result, the shunt-winding $p$ is connected to the terminals of the resistance $l$ by means of the wires 1 $n$ 2, and its phase relation to $k$ is shown by $l$ in Fig. 4. Then the other coil $o$ is connected to the terminals of the resistance $m$ by the wires 3 $n$ 4. The connections of the coil $o$ are such that its phase relations lie between the lines $k$ and $l$, and the current and pressure of this coil, therefore, are represented by the line $m$ of Fig. 5. By combining the two currents or magnetisms of the windings $o$ and $p$, which are represented by the lines $l$ and $m$ of Fig. 5, the resultant $t$ of Fig. 6 is obtained, which is at right angles to or ninety degrees from the line $k$, which represents the impressed electromotive force of the circuit.

Where two motors are employed, the series field-windings are connected in the leads $c$ and $e$, and in this case the shunt field-winding $r$ will be supplied from $k$ of the artificial neutral resistance and have $l$ reversed through $q$, as shown in Fig. 7, thereby making the line $m$ and the resultant $t$ ninety degrees apart.

In the diagram of Fig. 8 there is shown the effect of the presence of induction in the shunt field-windings $o$ and $p$, which brings the resultant $t$ beyond ninety degrees; but this variation can be compensated for in any well-known manner, such as is shown in Fig. 3, by the use of adjustable resistances $x$ and $y$. The diagram of Fig. 9 shows the resultant $t$ corrected to quadrature with $k$ by increasing the magnitude of C. In these Figs. 8 and 9 C and B represent the lagging magnetism produced by the current obtained from the resistances $m$ and $l$, also representing the electromotive forces. By varying the adjustable resistances the effect of the current through the coils may be varied so as to secure the resultant $t$ at right angles to $k$, as is shown.

It is not essential that two artificial neutral resistances should be employed, as is shown in Fig. 1. I have shown in Fig. 3 the employment of a single artificial neutral resistance supplying both motors of the meter. Each of the two artificial neutral resistances of Fig. 1 reproduces the pressure relations of the generator, and one therefore may be used for both motor devices just as well as to duplicate them.

The essential features of my invention will be understood by reference to the Figs. 4, 5, and 6, 7, 8, and 9. I have explained by these diagrams how I make use of the reproduction of the pressure relations of the generator, which results from the use of the artificial neutral resistance to produce a resultant magnetic field for the pressure-winding which shall be maintained in quadrature with the impressed electromotive force of the circuit including the series field-winding. This result having been secured, the method of indicating or integrating the true watts flowing in the circuit will be readily understood by those skilled in the art. The total turning effect upon the movable element of the meter exercised by the magnetic fields by which the armatures are influenced will be proportional to the true energy of the circuit, and this may be integrated by the well-known means of a counting-train attached to the armature and which I have indicated in Fig. 1. The mechanical connection between the two armatures, which is preferably secured by mounting them upon one spindle, is indicated by dotted lines connecting the armatures in Fig. 1.

The portions $o\ p$ constitute inductively-related coils of the meter pressure-winding.

Various modifications in the details of the apparatus and circuits by which my invention may be realized will occur to those skilled in the art. I do not wish, therefore, to be limited to the specific apparatus and arrangement of circuits shown; but, Having described my invention, what I claim as new, and desire to secure by Letters Patent, is—

1. In an induction motor-meter, the combination with a movable element, of a series and a pressure field-winding in inductive relation therewith, and an artificial neutral resistance adapted for interposition between the mains of the circuit connected with said pressure field-winding, independently of the latter winding and adapted in coöperation with the said pressure field-winding to maintain the magnetic field thereof in quadrature with the electromotive force of the circuit including said series winding, substantially as described.

2. In a motor-meter the combination with current and pressure windings for effecting the movement of the movable element of the meter, of an artificial neutral resistance adapted for interposition between the mains of the circuit independently of said pressure-winding, and in coöperation with said pressure-winding serving to maintain the desired phase relation between the pressure-field and the electromotive force of the working circuit, substantially as described.

3. The combination with a three-phase system of alternating-current distribution, of a motor-meter having current and pressure windings, and an artificial neutral resistance connected directly between the sides of the system independently of the pressure-winding and coöperating with the pressure-winding to maintain the desired phase relation between the pressure-field and the electromotive force of the working circuit, substantially as described.

4. The combination with a three-phase system of alternating-current distribution, of a motor-meter having current and pressure windings, and an artificial neutral resistance having three branches interposed between the sides of the three branches of the system independently of the pressure-winding and coöperating with the pressure-winding to maintain the desired phase relation between the pressure-field and the electromotive force of the working circuit, substantially as described.

5. In a motor-meter, the combination with current and pressure windings for effecting the movement of the movable element of the meter, of an artificial neutral resistance adapted for interposition between the mains of the circuit independently of said pressure-winding, and in coöperation with said pressure-winding serving to maintain the desired phase relation between the pressure-field and the electromotive force of the working circuit, and an armature in inductive relation with said pressure and current windings, substantially as described.

6. The combination with a three-phase system of alternating-current distribution, of a motor-meter having current and pressure windings, and an artificial neutral resistance connected directly between the sides of the system independently of the pressure-winding and coöperating with the pressure-winding to maintain the desired phase relation between the pressure-field and the electromotive force of the working circuit, and an armature in inductive relation with said pressure and current windings, substantially as described.

7. The combination with a three-phase system of alternating-current distribution, of a motor-meter having current and pressure windings, and an artificial neutral resistance having three branches interposed between the sides of the three branches of the system independently of the pressure-winding, and coöperating with the pressure-winding to maintain the desired phase relation between the pressure-field and the electromotive force of the working circuit, and an armature in inductive relation with said pressure and current windings, substantially as described.

8. In a motor-meter, the combination with current and pressure windings for effecting the movement of the movable element of the meter, of an artificial neutral resistance adapted for interposition between the mains of the circuit independently of said pressure-winding, and in coöperation with said pressure-winding serving to maintain the desired phase relation between the pressure-field and the electromotive force of the working circuit, said pressure-winding receiving its current through said resistance, substantially as described.

9. The combination with a three-phase system of alternating-current distribution, of a motor-meter having current and pressure windings, and an artificial neutral resistance connected directly between the sides of the system independently of the pressure-winding and coöperating with the pressure-winding to maintain the desired phase relation between the pressure-field and the electromotive force of the working circuit, said pressure-winding receiving its current through said resistance, substantially as described.

10. The combination with a three-phase system of alternating-current distribution, of a motor-meter having current and pressure windings, and an artificial neutral resistance having three branches interposed between the sides of the three branches of the system independently of the pressure-winding and coöperating with the pressure-winding to maintain the desired phase relation between the pressure-field and the electromotive force of the working circuit, said pressure-winding receiving its current through said resistance substantially as described.

11. In a three-phase meter, the combination with current and pressure windings, the latter being divided into two inductively-related coils, of a star-connected resistance receiving current independently of the pressure-winding, each coil of which is connected across a branch of the star-connected resistance, substantially as described.

12. In a three-phase meter, the combination with a movable element, of a current field-winding in inductive relation therewith, a pressure-coil also in inductive relation therewith, a second pressure-coil also in inductive relation with said movable element and adapted to have its phase relation lie between the impressed electromotive force of the circuit including the current-winding and that of the current in said first pressure-coil, and a star-connected artificial resistance receiving current from the work-circuit independently of the pressure-winding, each pressure-coil being connected across a branch of the said artificial resistance, substantially as described.

13. In a three-phase meter, the combination with current and pressure windings, the latter being divided into two coils, of a star-connected resistance receiving current independently of the pressure-winding, each coil of which is connected across a branch of the star-connected resistance, substantially as described.

14. In a motor-meter, the combination with current and pressure windings, the pressure-winding being divided into two inductively-related coils included in circuit with each other, of phase-modifying resistance having branches in parallel with said pressure-coils, substantially as described.

15. In a three-phase meter, the combination with current and pressure windings, the latter being divided into two inductively-related coils, of a star-connected resistance receiving current independently of the pressure-winding, each coil of which is connected across a branch of the star-connected resistance, substantially as described.

16. In a motor-meter, the combination with current and pressure windings, the pressure-winding being divided into coils in circuit with each other, of phase-modifying resistance having branches in parallel with said pressure-coils, substantially as described.

In witness whereof I hereunto subscribe my name this 30th day of September, A. D. 1899.

THOMAS DUNCAN.

Witnesses:
GEORGE L. CRAGG,
CHARLES E. HUBERT.